United States Patent
Singh et al.

(10) Patent No.: US 8,289,940 B2
(45) Date of Patent: Oct. 16, 2012

(54) SYSTEM AND METHOD FOR CHANNEL ACCESS IN DUAL RATE WIRELESS NETWORKS

(75) Inventors: Harkirat Singh, Santa Clara, CA (US);
Xiangping Qin, Carbondale, IL (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 725 days.

(21) Appl. No.: 12/357,360

(22) Filed: Jan. 21, 2009

(65) Prior Publication Data

US 2010/0014502 A1 Jan. 21, 2010

Related U.S. Application Data

(60) Provisional application No. 61/081,005, filed on Jul. 15, 2008.

(51) Int. Cl.
*H04W 74/08* (2009.01)
(52) U.S. Cl. ................................ 370/338; 370/447
(58) Field of Classification Search ........................ None
See application file for complete search history.

(56) References Cited

U.S. PATENT DOCUMENTS

| | | | |
|---|---|---|---|
| 6,584,116 B1 | 6/2003 | Gourgue et al. | |
| 6,640,087 B2 | 10/2003 | Reed et al. | |
| 7,366,464 B2 * | 4/2008 | Iacono et al. | 455/25 |
| 7,403,488 B2 * | 7/2008 | Gu et al. | 370/252 |
| 7,428,428 B2 | 9/2008 | Wong et al. | |
| 7,519,043 B2 | 4/2009 | Porter et al. | |
| 7,609,648 B2 | 10/2009 | Hoffmann et al. | |
| 7,675,884 B2 * | 3/2010 | Ye | 370/329 |
| 7,889,701 B2 | 2/2011 | Malik et al. | |
| 8,005,055 B2 | 8/2011 | Kwak et al. | |
| 8,031,666 B2 | 10/2011 | Jeon et al. | |
| 8,045,484 B2 | 10/2011 | Peleg et al. | |
| 8,054,223 B2 | 11/2011 | Lakkis | |
| 8,081,110 B2 | 12/2011 | Lakkis | |
| 2005/0037822 A1 | 2/2005 | Regnier et al. | |
| 2005/0143133 A1 | 6/2005 | Bridgelall | |

(Continued)

OTHER PUBLICATIONS

Hachman; "CE giants back Amimon's Wireless HDTV tech", PCMAG.COM, Jul. 23, 2008.

(Continued)

*Primary Examiner* — Kwang B Yao
*Assistant Examiner* — Alex Skripnikov
(74) *Attorney, Agent, or Firm* — Kenneth L. Sherman, Esq.; Michael Zarrabian, Esq.; Sherman & Zarrabian LLP

(57) ABSTRACT

A system and method for wireless communication over multi-rate channels are disclosed. One embodiment of the system includes source and destination devices that use first and second channels under a contention-based protocol. The first channel is directional with a first frequency and a first range. The second channel is omni-directional with a second frequency and a second range. The second frequency is lower than the first frequency, and the second range is greater than the first range. The source device may send the destination device a request for data transmission via the first channel over the second channel. The destination device may send the source device an approval for the data transmission over the second channel. The source device may further transmit an acknowledgment (ACK) of the approval over the second channel upon receiving the approval to prevent other devices in the system from contending for data transmission.

25 Claims, 12 Drawing Sheets

U.S. PATENT DOCUMENTS

| | | |
|---|---|---|
| 2006/0209772 A1 | 9/2006 | Fang et al. |
| 2007/0002876 A1 | 1/2007 | Berkman et al. |
| 2007/0099668 A1 | 5/2007 | Sadri et al. |
| 2007/0204205 A1 | 8/2007 | Niu et al. |
| 2007/0240191 A1 | 10/2007 | Singh et al. |
| 2007/0280184 A1 | 12/2007 | Shin et al. |
| 2008/0095072 A1 | 4/2008 | Shao et al. |
| 2008/0095104 A1* | 4/2008 | Hansen .................. 370/329 |
| 2008/0273600 A1 | 11/2008 | Singh et al. |
| 2009/0109938 A1 | 4/2009 | Singh et al. |
| 2009/0232103 A1 | 9/2009 | Kesselman et al. |
| 2009/0233635 A1 | 9/2009 | Li et al. |
| 2010/0014489 A1 | 1/2010 | Qin et al. |

OTHER PUBLICATIONS

Hitachi et al., High Definition Multimedia Interface (HDMI) Specifications version 1.2, Aug. 22, 2005, pp. 1-214.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003.

LG Electronics et al., WirelessHD Publication of Specification Version 1.0 Overview, Oct. 9, 2007, pp. 1-77.

LG Electronics et al., WirelessHD Specifications Rev. 0.1, Jul. 12, 2006, pp. 1-175.

Maruhashi et al., "Wireless uncompressed-HDTV-signal transmission system utilizing compact 60-GHz-band transmitter and receiver," Microwave Symposium Digest, 2005 IEEE MTT-S International, Jun. 12-17, 2005.

MBOA, Distributed Medium Access Control (MAC) for wireless networks, WiMedia Alliance, Draft 0.99, Nov. 1, 2005.

NEC develops compact millimeter-wave transceiver for uncompressed HDTV signal transmission, NE Asia Online, Apr. 5, 2005.

"A 5/60GHz hybrid system concept," *IST Broadway, 12 pages; available at www.ist-browadway.org/documents/broadway-broadband_air_interfaces_cluster.pdf* (last visited on Apr. 24, 2008).

Draves et al., "Routing in multi-radio, multi-hop wireless mesh networks," 15 pages, MobiCom '04, Sep. 26-Oct. 1, 2004.

"Evaluation of centralized adhoc network architecture (CANA)," BAI cluster workshop Mar. 2004, Marc de Courville and all, IST BroadWay project, Jun. 1, 2004, 17 pages.

Heinzelman et al., "Energy efficient communication protocol for wireless microsensor networks," *Proc. The 33rd Hawaii International Conference on System Science*, Hawaii, U.S.A., Jan. 2000.

Iannone et al., "Can multi-rate radios reduce end-to-end delay in mesh networks? A simulation case study," *Mesh Networking: Realizing the Wireless Internet (Meshnets)*, Jul. 2005.

IEEE P802.11n™/ D3.00, Draft Standard for information technology-Telecommunications and information exchange between systems-Local and metropolitan area networks-Specific requirements—Part 11: Wireless LAN Medium Access Control (MAC) and Physical Layer (PHY) specifications: Amendment 4: Enhancements for Higher Throughput, *IEEE*, 2007.

IEEE Standard for Information technology 802.11—Telecommunications and information exchange between systems—Local and metropolitan area networks—Specific requirements. Part 11: Wireless LAN Medium Access Control (MAC) and Physical Layer (PHY) specifications, IEEE Computer Society, 1232 pages, (Jun. 12, 2007).

Ramachandran et al., "Interference-aware channel assignment in multi-radio wireless mesh networks," *Infocom 2006*.

Ros et al., "Cluster-based OLSR extensions to reduce control overhead in mobile Ad hoc networks," *International wireless Communications and Mobile Computing Conference (IWCMC 2007)* Department of Information and Communications Engineering, University of Murcia, pp. 202-207, Aug. 12-16, 2007, Honolulu, Hawaii, U.S.A.

Villasenor-Gonzalez et al., "HOLSR: A hierarchical proactive routing mechanism for mobile Ad hoc networks," *IEEE Communications Magazine* (Jul. 2005).

Choi, S. et al., "IEEE 802.11e Contention-Based Channel Access (EDCF) Performance Evaluation," Proceedings of the IEEE International Conference on Communications (ICC '03), May 2003, pp. 1151-1156, vol. 2, IEEE, United States.

Madhow, U., "MultiGigabit Millimeter Wave Communication: System Concepts and Challenges," Proceedings of the 2008 Information Theory and Applications Workshop, Jan. 2008, pp. 193-196, IEEE, United States.

Perahia, E. et al., "Next Generation Wireless LANs: Throughput, Robustness, and Reliability in 802.11n," Sep. 2008, pp. 1-10, Cambridge University Press, United Kingdom.

U.S. Non-Final Office Action for Application U.S. Appl. No. 12/348,817 mailed Dec. 5, 2011.

Takai, M. et al., "Directional Virtual Carrier Sensing for Directional Antenna in Mobile Ad Hoc Networks," Proceedings of the 3rd ACM International Symposium on Mobile Ad Hoc Networking & Computing (MobiHoc '02), Jun. 2002, pp. 183-193, ACM, United States.

U.S. Final Office Action for Application U.S. Appl. No. 12/348,817 (SAM2B-P.130) mailed Jun. 27, 2012 by Examiner Jay P. Patel.

* cited by examiner

SYSTEM AND METHOD FOR CHANNEL ACCESS IN DUAL RATE WIRELESS NETWORKS

RELATED APPLICATION

This application claims priority from U.S. Provisional Patent Application No. 61/081,005, filed on Jul. 15, 2008, which is incorporated herein by reference.

BACKGROUND OF THE INVENTION

1. Field of the Invention

The present invention relates to a wireless network, and in particular, to a wireless network having multi-rate channels.

2. Description of the Related Technology

Wireless networks typically include a plurality of wireless stations. When a wireless network includes three or more wireless stations, the wireless network needs to manage the transmission of data and/or control signals between the wireless stations.

Certain wireless networks allocate time for data and/or control signals between wireless stations therein, using a so-called contention-based protocol (CBP). A contention-based protocol is a communications protocol that allows wireless stations to use the same radio channel without pre-coordination.

According to the United States Federal Communication Commission rules, a contention-based protocol is defined as "a protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel." The "listen before talk" operating procedure in IEEE 802.11 is the most well-known contention-based protocol.

Some wireless networks use multi-rate channels for the transmission of data and/or control signals between wireless stations therein. Such wireless networks may use a contention-based protocol for allocating time for data and/or control signal transmission. Such wireless networks, however, may have a problem in using a contention-based protocol due to the characteristics of the multi-rate channels. Therefore, there is a need for a scheme suitable for wireless networks using multi-rate channels.

SUMMARY OF CERTAIN INVENTIVE ASPECTS

In one embodiment, there is a device for wireless communication. The device comprises: a first antenna system configured to provide directional transmission/reception at a first frequency within a first range; a second antenna system configured to provide omni-directional transmission/reception at a second frequency within a second range; and a medium access control (MAC) layer configured to use the second antenna system to send another wireless device a request for wireless data transmission via the first antenna system. The second frequency is lower than the first frequency, and the second range is greater than the first range. The MAC layer is further configured to use the second antenna system to receive an approval for the wireless data transmission from the other wireless device. The MAC layer is further configured to use the second antenna system to transmit an acknowledgment of the approval upon receiving the approval. The MAC layer is further configured to use the first antenna system to transmit one or more data packets to the other wireless device upon receiving the approval.

In another embodiment, there is a device for wireless communication. The device comprises: a first antenna system configured to provide directional transmission/reception at a first frequency within a first range; a second antenna system configured to provide omni-directional transmission/reception at a second frequency within a second range; and a medium access control (MAC) layer configured to use the second antenna system to receive a request for wireless data transmission from a second wireless device, and to refrain from contending for data transmission for a first period of time based at least partly on the request. The second frequency is lower than the first frequency, and the second range is greater than the first range. The MAC layer is further configured to use the second antenna system to receive an approval for the wireless data transmission from a third wireless device, and to refrain from contending for data transmission for a second period of time based at least partly on the approval. The second period of time is shorter than the first period of time. The MAC layer is further configured to use the second antenna system to receive an acknowledgment (ACK) of the approval from the second wireless device, and to refrain from contending for data transmission for a third period of time based at least partly on the ACK of the approval, the third period of time being shorter than the second period of time.

In yet another embodiment, there is a wireless communication system. The system comprises: a first wireless device; and a second wireless device. Each of the first and second wireless devices comprises: a first antenna system configured to provide directional transmission/reception at a first frequency within a first range; and a second antenna system configured to provide omni-directional transmission/reception at a second frequency within a second range. The second frequency is lower than the first frequency, and the second range is greater than the first range. The first wireless device is configured to use the second antenna system of the first wireless device to send the second wireless device a request for data transmission via the first antenna systems of the first and second wireless devices. The second wireless device is configured to use the second antenna system of the second wireless device to send the first wireless device an approval for the data transmission. The first wireless device is further configured to use the second antenna system of the first wireless device to transmit an acknowledgment (ACK) of the approval upon receiving the approval.

In yet another embodiment, there is a method of wireless communication. The method comprises: transmitting a request for wireless data transmission via a first channel having a first frequency and directionality, wherein the request is transmitted over a second channel having a second frequency and omni-directionality. The second frequency is lower than the first frequency. The method also includes determining if an approval for the wireless data transmission is received over the second channel; transmitting an acknowledgment of the approval over the second channel if the approval has been received; and transmitting data over the first channel if the approval has been received.

In yet another embodiment, there is a method of wireless communication. The method comprises: conducting contention-based access for data transmission. Conducting the contention-based access comprises: refraining from contending for data transmission for a first period of time, based at least partly on a received request for wireless data transmission via a first channel having a first frequency and directionality, wherein the request is received over a second channel having a second frequency and omni-directionality. The second frequency is lower than the first frequency. Conducting the contention-based access further comprises continuing to refrain from contending for data transmission for a second period of time, if an approval for the wireless data transmission is received over the second channel during the first period of time, and/or to refrain from contending for data transmission for a third period of time, if an acknowledgment (ACK) of the approval is received over the second channel during the first period of time, wherein the first period of time includes the second period of time, wherein the second period of time includes the third period of time, and wherein the first, second, and third periods of time end simultaneously with one another.

In yet another embodiment, there is a method of wireless communication. The method comprises: transmitting, from a first wireless device to a second wireless device, a request for wireless data transmission via a first channel having a first frequency and directionality, wherein transmitting the request comprises using a second channel having a second frequency and omni-directionality. The second frequency is lower than the first frequency. The method also includes transmitting, from the second wireless device to the first wireless device, an approval for the wireless data transmission over the second channel; transmitting, from the first wireless device, an acknowledgment (ACK) of the approval over the second channel; and transmitting, from the first wireless device to the second wireless device, data over the first channel.

DETAILED DESCRIPTION OF CERTAIN INVENTIVE EMBODIMENTS

Figure 1:
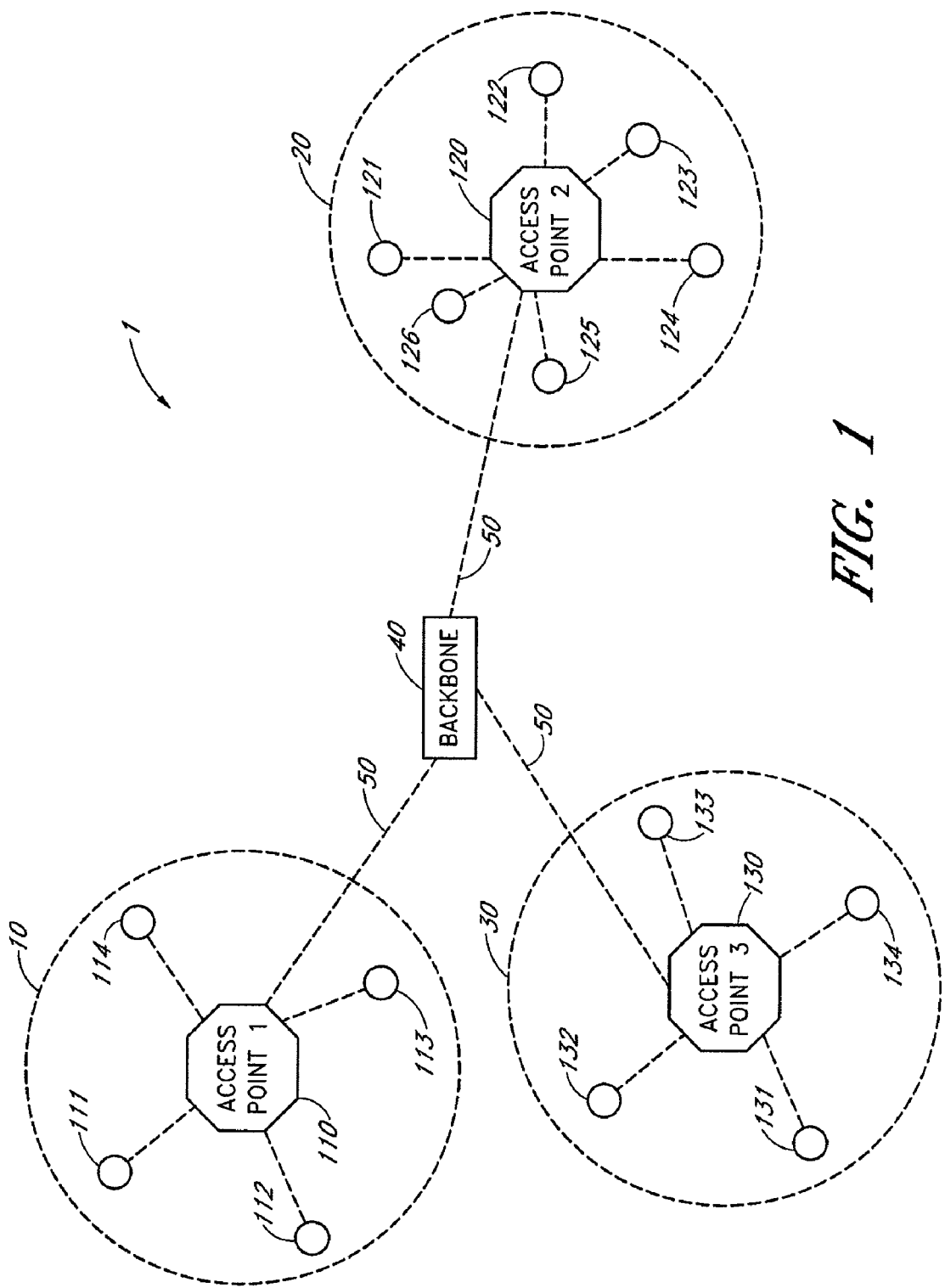
FIG. 1 is a block diagram illustrating an example wireless network including a plurality of sub-networks.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. Various processors, memories, computer readable media and programs can be used to implement the invention.

Overview of Wireless Network

Referring to FIG. 1, an example wireless network will be described below. The wireless network 1 includes a plurality of sub-networks 10, 20, 30 and a network backbone 40. The illustrated portion of the network 1 includes three sub-networks, but a skilled technologist will appreciate that the network can include more or less sub-networks.

Each of the sub-networks 10, 20, 30 includes an access point 110, 120, 130 and one or more wireless stations or devices 111-114, 121-126, 131-134. Each of the access points 110-130 is capable of performing wireless communication with the one or more wireless stations within the sub-network according to a wireless communication protocol. The access points 110-130 are also connected to the network backbone 40 via wired or wireless channels 50. Each of the access points 110-130 may provide communication between stations within its respective sub-network 10-30 or between a station in its sub-network and another station in another sub-network.

The one or more wireless stations are located within a coverage region within which the access point can communicate wirelessly. The one or more stations can be electronic devices that can wirelessly connect to one or more of the access points 110, 120, 130. Examples of such electronic devices include, but are not limited to, a mobile phone, a telephone, a television, a set-top box, a computer monitor, a computer, a hand-held computer, a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc. In certain arrangements, one or more stations can belong to two or more sub-networks. In certain embodiments, at least one of the access points 110, 120, 130 may be part of such an electronic device.

The network backbone 40 serves to interconnect the sub-networks 10, 20, 30 to one another, providing a path for the exchange of information between them. The network backbone 40 can be connected to another backbone for communication with another network.

In one embodiment, the sub-networks 110-130 may be in compliance with the same communication protocol. In other embodiments, one of the sub-networks 110-130 may comply with a communication protocol different from the protocols of the other sub-networks. In certain arrangements, the access points and the stations may be in compliance with IEEE 802.11 standard. In one embodiment, the network 1 can form a wide area network (WAN), and each of the sub-networks 10-30 can form a local area network (LAN). In another embodiment, the network 1 can form a local area network (LAN). In certain embodiments, at least one of the sub-networks 110-130 may form an ad-hoc network without an access point.

Wireless Network Employing Multi-Rate Channels

In one embodiment, each station on a wireless network uses both a high-rate channel (HRC) and a low-rate channel (LRC). The high-rate channel has a shorter range than the low-rate channel. The high-rate channel may be directional whereas the low-rate channel may be directional or omni-directional. In certain embodiments, the low rate channel may be omni-directional as a default, and optionally directional.

The channels can be established to be directional or omni-directional by using different antenna systems. In the context of this document, the terms "directional channel" and "omni-directional channel" can be interchangeably used with "directional transmissions/reception capability" and "omni-directional transmissions/reception capability," respectively.

In some embodiments, a coordinator device (e.g., an access point) on the network may schedule high-rate transmissions between respective two of the stations such that the transmissions do not overlap with one another. In other embodiments, a station on the network may transmit data over either the high-rate channel or the low-rate channel, depending on the channel conditions. For example, when the directional high-rate channels that are primarily used for data transmission are blocked or face frequent outages or poor channel quality, the low-rate channel can be alternatively used for data transmission. In certain embodiments, the high-rate channel may also be used for transmitting control messages.

Figure 2:
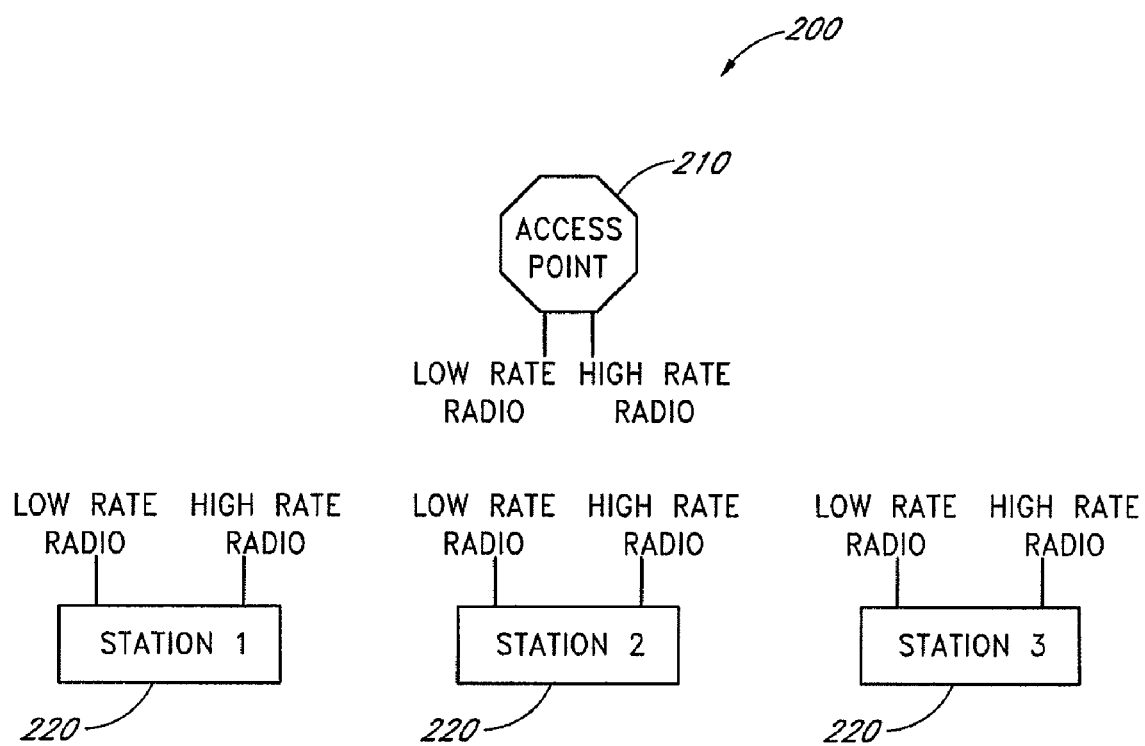
FIG. 2 is a block diagram of a wireless network including an access point and wireless stations employing a high-rate radio and a low-rate radio according to one embodiment.

Referring to FIG. 2, a system for a wireless network employing multi-rate channels according to one embodiment will be now described below. The illustrated system 200 includes an access point 210 and first to third stations 220, 230, 240. The access point 210 and the stations 220-240 can communicate with one another via a low-rate channel (LRC) and a high-rate channel (HRC). Each of the access point 210 and the stations 220-240 includes two interfaces or radios for the low-rate channel and high-rate channel, respectively.

In one embodiment, the high-rate channel may have a frequency from about 6 GHz to about 300 GHz. Such a frequency may include an extremely high frequency (EHF). The high-rate channel may be a 60 GHz channel that is supported by 60 GHz millimeter-wave radio. In one embodiment, the communication range of a 60 GHz channel for an indoor environment may be of the order of 10 meters. In other embodiments, the high-rate channel can use a terahertz frequency ranging between 300 GHz and 3 THz.

Figure 3A:
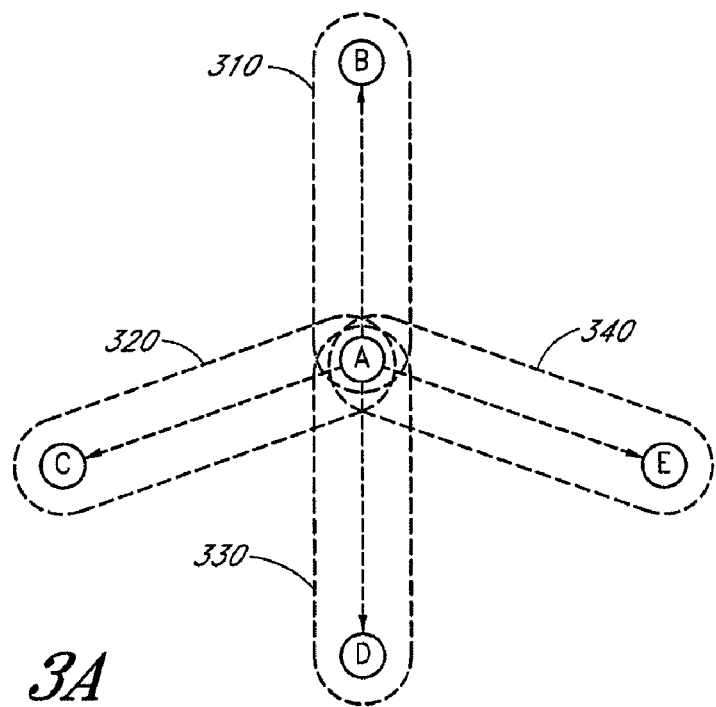
FIG. 3A is a diagram illustrating high-rate directional channels used in the network of FIG. 2.

The high-rate channel may be directional, as shown in FIG. 3A. In FIG. 3A, a station A can establish a high-rate channel 310-340 for communication with one of neighboring stations B-E. The station A can send data and/or a control signal to only one of the stations B-E over a high-rate channel 310-340 at a time. The low-rate channel may be a channel having a frequency below 6 GHz. In one embodiment, the low-rate channel can be a 2.4 GHz or 5 GHz channel that can support Wireless Local Area Network (WLAN). The interface for the low-rate channel may be in compliance with IEEE 802.11. All versions of IEEE 802.11 standard are incorporated herein by reference. In one embodiment, the low-rate channel for an indoor environment that has a frequency lower than 6 GHz can have a range of about 20 meters to about 100 meters.

Figure 3B:
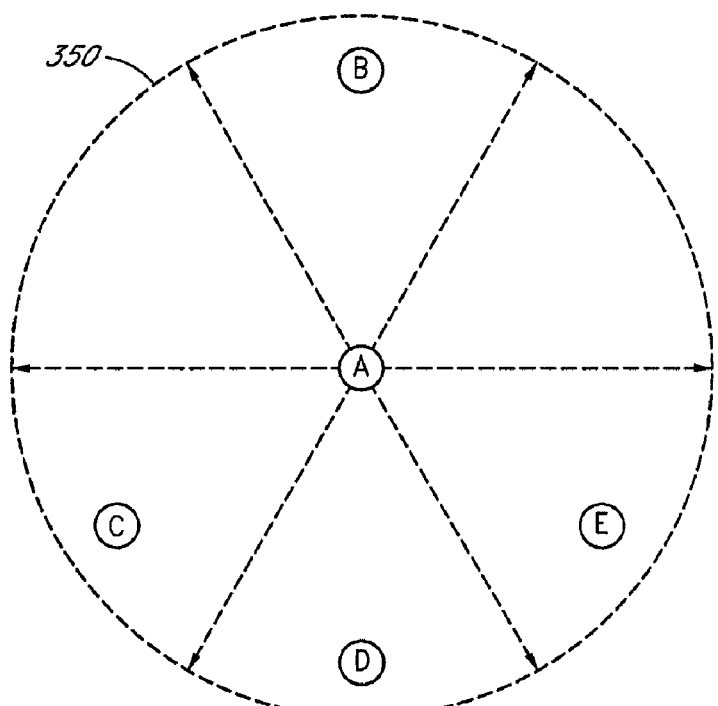
FIG. 3B is a diagram illustrating a low-rate omni-directional channel used in the network of FIG. 2.

The low-rate channel may be omni-directional, as shown in FIG. 3B. In FIG. 3B, the station A can establish a low-rate channel 350 for communication with the neighboring stations B-E. The station A can send a signal simultaneously to the neighboring stations B-E via the low-rate channel 350. In addition, the signal can be sent to other stations as long as the other stations are within the range of the low-rate channel. In another embodiment, the low-rate channel may be directional. In certain embodiments, the low-rate channel can be either directional or omni-directional, depending on the transmission needs. In some embodiments, the low-rate channel can be omni-directional as a default, and optionally directional.

In one embodiment, the high-rate channel may be used to transmit data, information, or certain control messages. The data can be audio, video, and/or textual data in any suitable form. The data can be compressed or uncompressed. The data may be in an encrypted or unencrypted form. In certain embodiments, the data may include management messages or information for the wireless network.

The low-rate channel may be used to transmit control signals. The control signals may be those used for reservation and allocation of radio sources used in the high-rate channel. For example, at least some of the control signals can be used for reservation of contention free period for data transmission, beacon transmission, and other control messages. In some embodiments, the low-rate channel may be used to exchange control messages related to, for example, beam-forming on the high-rate channel, channel quality, or the like. In transmitting such control signals, the wireless stations may use the most robust modulation and coding scheme available in the network so as to minimize transmission errors.

In certain embodiments, the low-rate channel may also be used for transmitting data. For example, when the high-rate channel is in a good condition, a source station can send a destination station data (for example, uncompressed data) over the high-rate channel. The high-rate channel which is directional can be easily blocked. In another instance where either or both of the source and destination stations are moving, the stations may lose wireless connectivity established over the high-rate channel. In these circumstances, the source station may reduce the size of the data by, for example, at least partially compressing the data, and transmit the data over the low-rate channel to the destination station.

Figure 4:
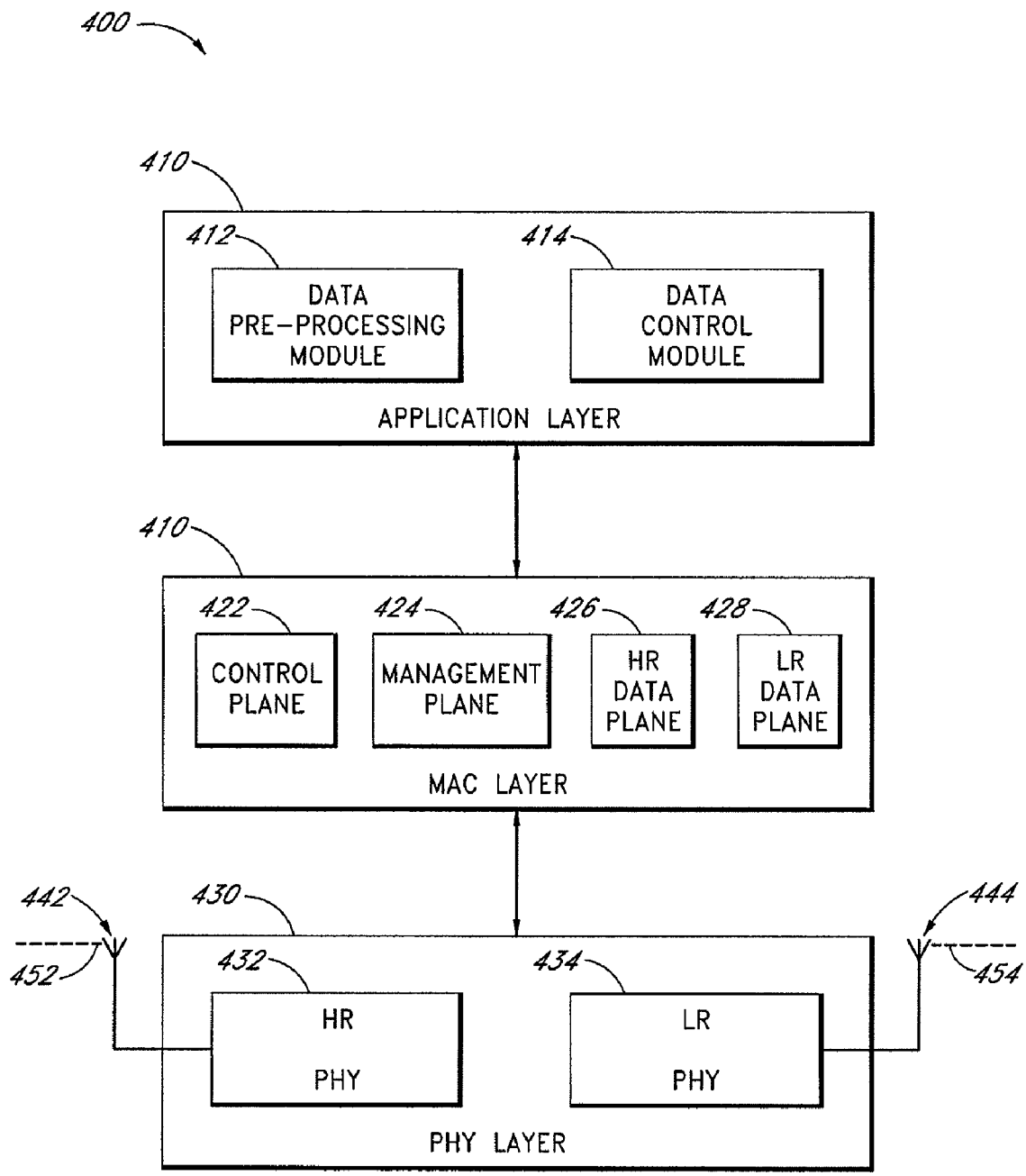
FIG. 4 is a block diagram of a wireless station including a high-rate radio and a low-rate radio according to one embodiment.

Referring to FIG. 4, a wireless station that can communicate with other stations or an access point in a network via a high-rate channel and a low-rate channel according to one embodiment will be described below. The illustrated wireless station 400 may serve as a transmitter, and includes an application layer 410, a medium access control (MAC) layer 420, and a physical (PHY) layer 430, and a first antenna system 442, and a second antenna system 444.

The application layer 410 may include a data pre-processing module 412 and a data control module 414. The data pre-processing module 412 can perform pre-processing of data, such as partitioning of data. The data control module 414 provides a standard way to exchange data handling information such as capability information. For example, before a connection begins, the data control module 414 negotiates the data formats to be used, and when the need for the connection is completed, data control commands are used to stop the connection.

The MAC layer 420 may include a control plane 422, a management plane 424, a high-rate data plane 426, and a low-rate data plane 428. The control plane 422 serves to control how the station 400 gains access to data and permission to transmit it over the network. In one embodiment, at least one of the control plane 422 and the management plane 424 is used to allocate contention-free periods on the high-rate channel. The control plane 422 and the management plane 424 may use the low rate channel for transmission of packets. In some embodiments, the control plane 422 and the management plane 424 may be in compliance with IEEE 802.11 standard.

The high-rate data plane 426 serves to process data from the application layer 410 to form packets suitable for high-rate transmission over a high-rate channel 452. The low-rate data plane 428 serves to process data from the application layer 410 to form packets suitable for low-rate transmission over a low-rate channel 454. In one embodiment, both the high rate data plane 426 and the low rate data plane 428 may use the control plane 422 and the management plane 424 when transmitting data. In other embodiments, each of the high rate data plane 426 and the low rate data plane 428 can include dedicated control and management planes.

The PHY layer 430 serves to further process the data and/or control packets from the MAC layer 420, and send them over wireless channels. The illustrated PHY layer 430 includes a high-rate (HR) PHY module 432 and a low-rate (LR) PHY module 434. The high-rate PHY module 432 adds PHY headers to data packets, and sends the packets over the high-rate channel 452 via the first antenna system 442. The first antenna system 442 may be capable of directional transmission and/or reception. The low-rate PHY module 432 adds PHY headers to control or data packets from the MAC layer 420, and sends the packets over the low-rate channel 454 via the second antenna system 444. The second antenna system may be capable of omni-directional and/or directional transmission and/or reception. In certain embodiments, the second antenna system 444 is configured to perform omni-directional transmission/reception as a default and to optionally provide directional transmission/reception.

Alternatively, the illustrated wireless station 400 may serve as a receiver. When serving as a receiver, the application layer 410, the MAC layer 420, and the PHY layer 430 of the station 400 can perform an inverse processing method of the layers 410-430 to regenerate data from data packets transmitted from another station over the wireless channels. A skilled technologist will appreciate that the configuration of the station can vary widely, depending on the design of the station as long as the station can send data and control information via a high rate channel and a low-rate channel, as described above.

Although not illustrated, the access point AP may include an application layer, a MAC layer, and a PHY layer, the configurations of which can be as described above with respect to FIG. 4. The access point may also include a routing module for connecting to a backbone. The routing module can provide a wired or wireless connection to the backbone, depending on the design of the network to which the access point belongs.

Contention-Based Access in a Wireless Network Employing Multi-Rate Channels

Referring to FIGS. 5A-5C and 6, a conventional method of transmitting data between two stations in a wireless network 500 will be described below. The wireless network 500 includes first to fourth stations 510-540. A skilled technologist will appreciate that the number and relative positions of the stations in the wireless network 550 can vary widely.

In the illustrated method, data transmission is performed in compliance with IEEE 802.11 standard, the disclosure of which is incorporated by reference in its entirety. Under IEEE 802.11, all control signal and data transmissions are performed using a radio having a frequency of, for example, 2.4 or 5 GHz, which is typically omni-directional. Such a radio has a relatively longer range than a radio having a higher frequency (such as 60 GHz).

IEEE 802.11 provides two types of contention-based access schemes for data transmission: Distributed Coordination Function (DCF) and Enhanced Distributed Channel Access Function (EDCAF). EDCAF is a contention-based access scheme under Hybrid Coordination Function (HCF). EDCAF obtains a large contention free period which is called "transmission opportunity (TXOP)," using contention. Since a series of packets are transmitted during the obtained TXOP, request-to-send (RTS)/clear-to-send (CTS) message exchange is used to protect the obtained period.

For example, the first station 510 in the wireless network 500 may serve as a source station of data and/or management message transmission. The second station 520 may serve as a destination station of the data and/or management message transmission.

Figure 5A:
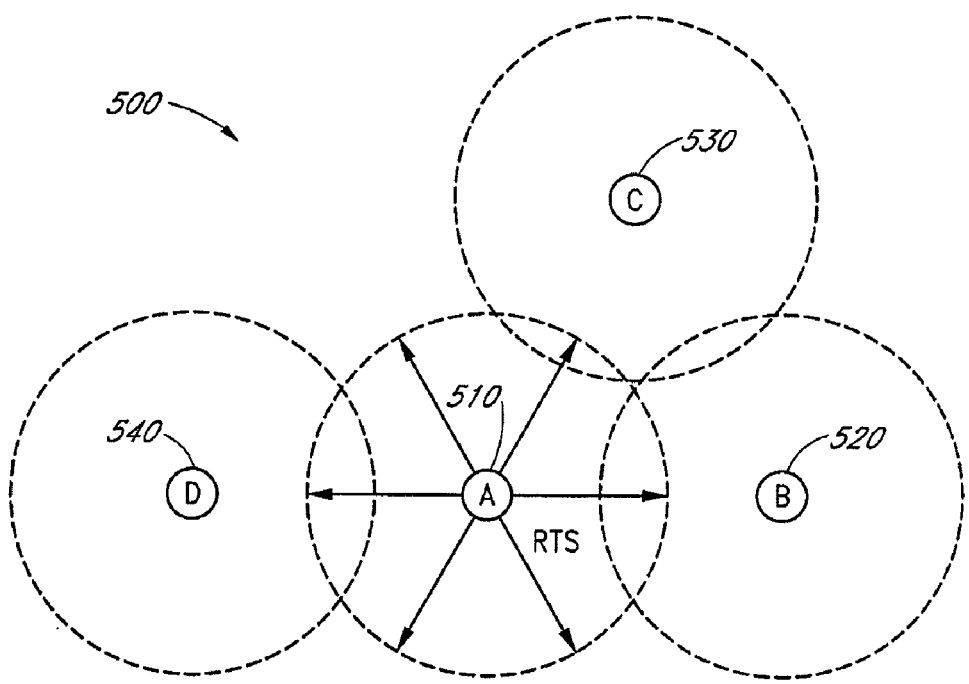
FIGS. 5A-5C are diagrams illustrating a conventional method of transmitting data between stations in a wireless network in compliance with IEEE 802.11.

Referring to FIG. 5A, the first station 510 may send a request-to-send (RTS) frame omni-directionally to the second station 520 to inquire the availability of the second station 520 for data transmission. The RTS frame may have a frame format that includes a frame control field, a duration field, a receiver address (RA) field, a transmitter address (TA) field, and a frame check sequence (FCS) field.

Figure 6:
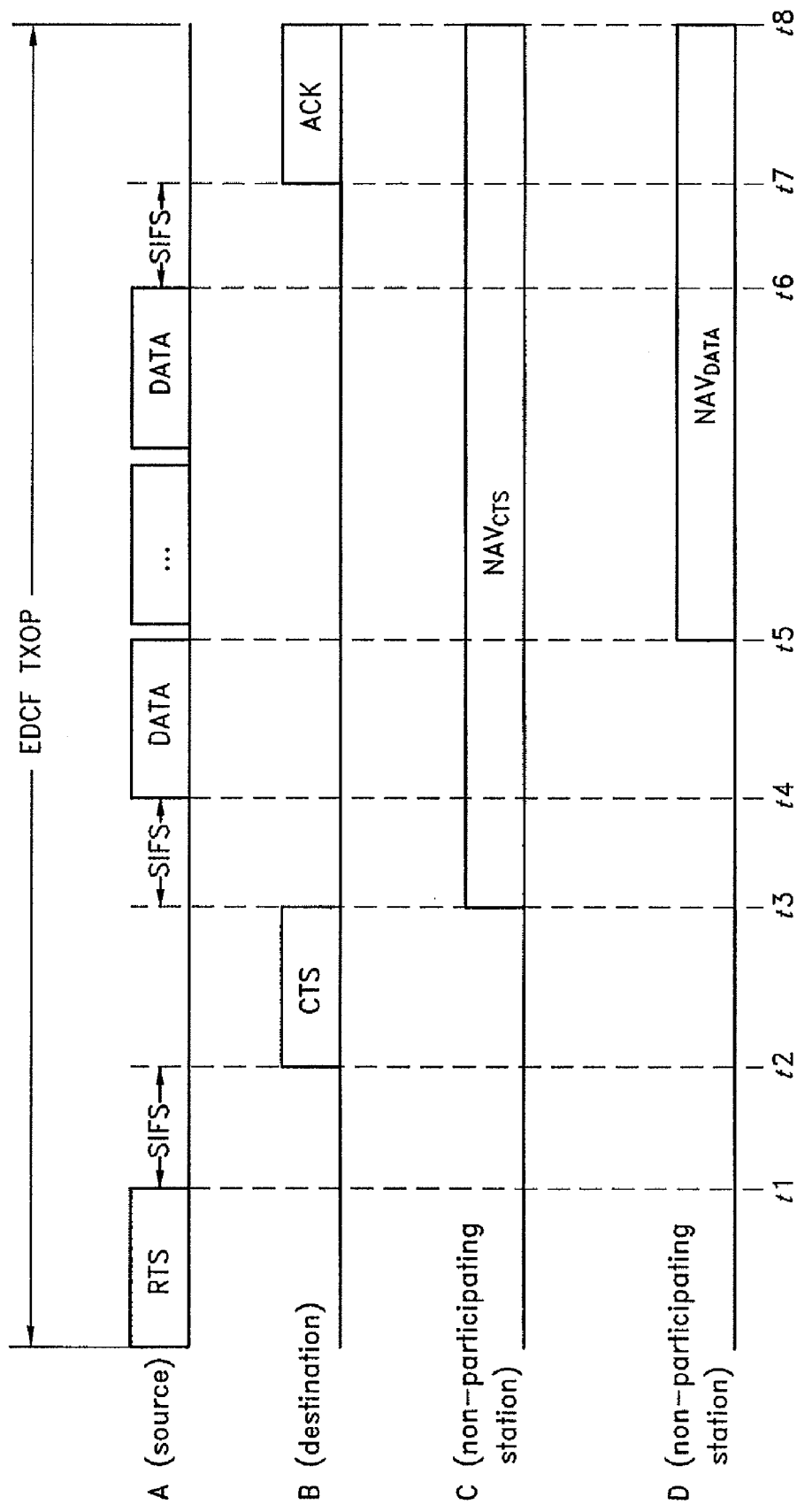
FIG. 6 is a timing diagram illustrating the conventional method of FIGS. 5A-5C.

The frame control field may include information on, for example, protocol version, type, subtype, power management, etc. The duration field may include a value indicative of time that remains in a transmission opportunity (TXOP) after the transmission of the RTS frame (i.e., a time period between t1 and t8 in FIG. 6). That is, the duration field includes the time, in microsecond, required to transmit a pending data or management frame, one CTS frame, and one acknowledgment (ACK) frame, plus three short interframe space (SIFS) intervals, as shown in FIG. 6. The RA field includes the address of the destination station that is the intended immediate recipient of the pending data or management frame. The TA field includes the address of the source station. The FCS field may include a cyclic redundancy code (CRC), for example, a 32-bit CRC. The details of the fields of the RTS frame may vary, based on the design of the wireless network. One or more of the fields may be omitted from the RTS frame. The RTS frame may include one or more additional fields for any suitable purpose.

Figure 5B:
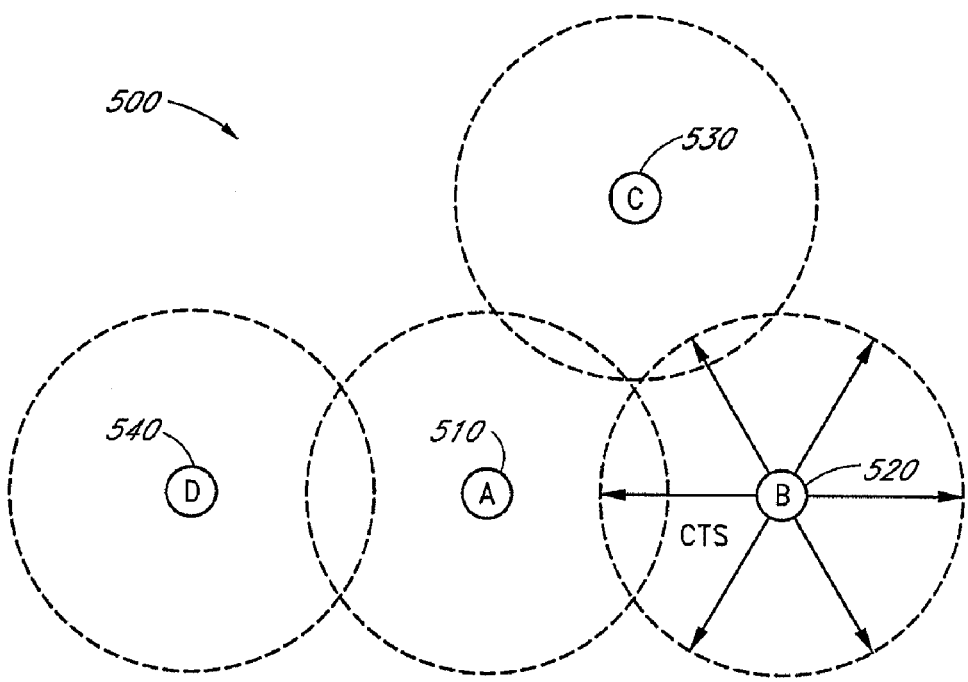

Referring to FIG. 5B, if the second station 520 is available for the data transmission, the second station 520 sends a clear-to-send (CTS) frame omni-directionally to the first station 510, notifying the first station 510 that the second station 520 is available for the data transmission. The CTS frame may have a frame format that includes a frame control field, a duration field, a receiver address (RA) field, and a frame check sequence (FCS) field.

The frame control field may include information on, for example, protocol version, type, subtype, power management, etc. The duration field may include a value obtained from the duration field of the immediately previous RTS frame, minus the time, in microseconds, required to transmit the CTS frame and its SIFS interval (i.e., a time period between t3 and t8 in FIG. 6). The RA field of the CTS frame is identical to the TA field of the immediately previous RTS frame, to which the CTS frame is a response. The FCS field may include a cyclic redundancy code (CRC), for example, a 32-bit CRC. The details of the fields of the CTS frame may vary widely, based on the design of the wireless network. One or more of the fields may be omitted from the CTS frame. The CTS frame may include one or more additional fields for any suitable purpose.

Figure 5C:
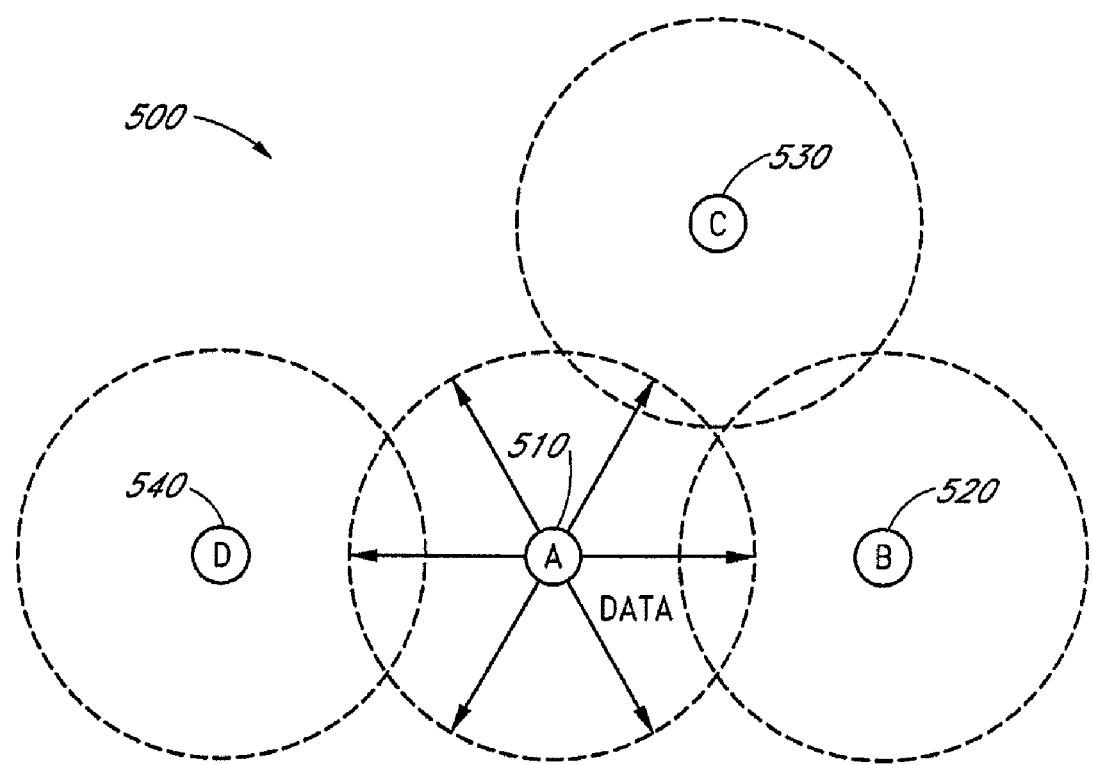

Referring to FIG. 5C, upon receiving the CTS frame, the first station 510 transmits one or more data frames omni-directionally for a period of time reserved for data transmission between the first and second stations 510, 520. One or more of the data frames may include a frame control field, a duration field, one or more address fields, a sequence control field, a quality-of-service (QoS) control field, a frame body field, and a frame check sequence (FCS) field.

The details of the frame control field and the FCS fields can be as described above with respect to the RTS and CTS frames. The duration field may include a value indicative of time remaining after the transmission of the data frame. For example, the duration field may include a value indicative of the time, in microseconds, required to transmit one ACK frame, plus one SIFS interval if the data frame is the last data frame during the TXOP. If there remain one or more subsequent data frames, the duration field may include a value indicative of the time, in microseconds, required to transmit the next data frame(s), plus one or more ACK frames, plus two or more SIFS intervals.

The address fields may include the addresses of the source and destination stations for the data transmission. The sequence control field may include a fragment number and a sequence number. The QoS control field includes information on the traffic category (TC) or traffic stream (TS) to which the frame belongs and various other QoS-related information about the frame that varies by frame type and subtype. The frame body field may include a MAC service data unit (MSDU) or a fragment thereof, and a security header and trailer. The details of the fields of the data frame may vary, based on the design of the wireless network. One or more of the fields may be omitted from the data frame. The data frame may include one or more additional fields for any suitable purpose.

In certain instances, the second station 520 may send the first station 520 an acknowledgment (ACK) frame upon receiving the data frame(s). The ACK frame may have a frame format that includes a frame control field, a duration field, an RA field, and a FCS field. The details of the frame control field, the RA field, and the FCS field can be as described above with respect to the CTS frame. The duration field may include a value obtained from the duration field of the immediately previous data frame minus the time, in microseconds, required to transmit the ACK frame and its SIFS interval. The details of the fields of the ACK frame may vary, based on the design of the wireless network. One or more of the fields may be omitted from the ACK frame. The ACK frame may include one or more additional fields for any suitable purpose.

While the data transmission scheme described above is carried out between the first and second stations 510, 520, the wireless network 500 prevents other stations (those that do not participate in the data transmission, and are hereinafter referred to as "non-participating stations") from contending for access or performing data transmission during the reserved transmission opportunity (TXOP) for the first and second stations 510, 520. The non-participating stations, for example, the third and fourth stations 530, 540 in FIG. 5A, are not allowed to perform data transmission during the reserved TXOP.

IEEE 802.11 provides protection of data transmission between source and destination stations (for example, the first and second stations 510, 520 in FIGS. 5A-5C) for a TXOP using a Network Allocation Vector (NAV) timer in each of stations in a wireless network. During a time period indicated by the NAV timer, non-participating stations in the network do not attempt to contend for data transmission.

The non-participating stations may update their NAV timers, based at least partially on a value in the duration field of a received frame(s). As described above, each of the RTS frame, CTS frame, data frame, and ACK frame includes a duration field that contains a value indicative of time remaining in the TXOP after the transmission of the frame. Stations in the network may receive a signal having such a frame as long as the stations are within the coverage of the signal. The non-participating stations may update their NAV timers with a value in the duration field of a most recently received frame when the value is smaller than a pre-existing NAV value in its NAV timer.

However, the non-participating stations are allowed to cancel or reset its NAV timer if there is no data transmission for a selected period of time. For example, under IEEE 802.11, if no PHY-RXSTART.indication is detected from the PHY layer of a non-participating station during a period that is equal to 2×SIFS intervals+CTS time+aPHY-RX-START-Delay+2×aSlotTime. The CTS time can be calculated, using the length of the CTS frame and the data rate at which the RTS frame used for the most recent NAV update was received. This configuration allows the non-participating stations to contend for data transmission if there is no actual data transmission between the source and destination stations during the reserved TXOP.

Referring back to FIG. 5A, in some instance where the wireless network 500 complies with IEEE 802.11, non-participating stations (for example, the third and fourth stations 530, 540) may receive the RTS frame transmitted omni-directionally by the first station 510. The third and fourth stations 530, 540 set their NAV timers based at least partly on a value indicated by the duration field of the RTS frame. The third and fourth stations 530, 540 are set to wait for a period of time indicated by their NAV timers before attempting to contend for data transmission.

Referring back to FIG. 5B, some of the non-participating stations (for example, the third station 530 in FIG. 5B) may also receive the CTS frame omni-directionally sent by the second station 520. The third station 530 may update its NAV timer, based at least partly on a value in the duration field of the CTS frame, as shown in FIG. 6.

In certain instances, other non-participating stations (for example, the fourth station 540) may not receive the CTS frame because, for example, the other non-participating stations are not within the coverage of the CTS frame from the second station 520. In such instances, the other non-participating stations wait for a selected period of time (for example, a period that is equal to 2×SIFS intervals+CTS time+aPHY-RX-START-Delay+2×aSlotTime as provided by IEEE 802.11) before it cancels its NAV timer to start contention for data transmission.

Referring back to FIG. 5C, even if the other non-participating stations (for example, the fourth station 540) do not receive the CTS frame, they may detect transmission of one or more data packets from the first station 510 to the second station 520 before the expiration of the selected period of time. In such an instance, the other non-participating station may update their NAV timers, using a value in the duration field of the data packet(s) transmitted from the first station 510, as shown in FIG. 6. If, however, the other non-participating stations do not detect data transmission from the first station 510 before the expiration of the selected period of time, they can cancel the NAV timer, and freely contend for data transmission.

The scheme described above in connection with IEEE 802.11 may apply to the example wireless network employing multi-rate channels described above in connection with FIGS. 2-4. In the example wireless network, data transmission is primarily performed over a high-rate channel (e.g., a channel having a frequency of 60 GHz), using a high-rate radio which is directional and short-ranged. Management and/or control signals are transmitted over a low-rate channel (e.g., a channel having a frequency of 2.4 or 5 GHz), using a low-rate radio which is omni-directional and long-ranged.

Figure 7A:
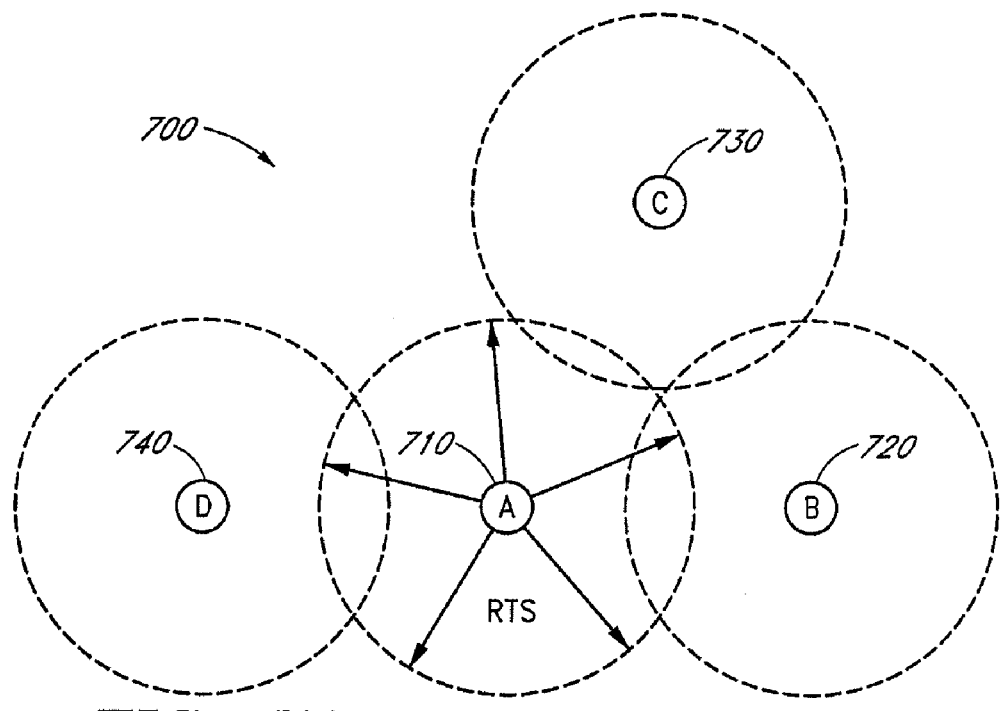
FIGS. 7A-7C are diagrams illustrating an example method of transmitting data between stations in a multi-rate channel wireless network.
Figure 7B:
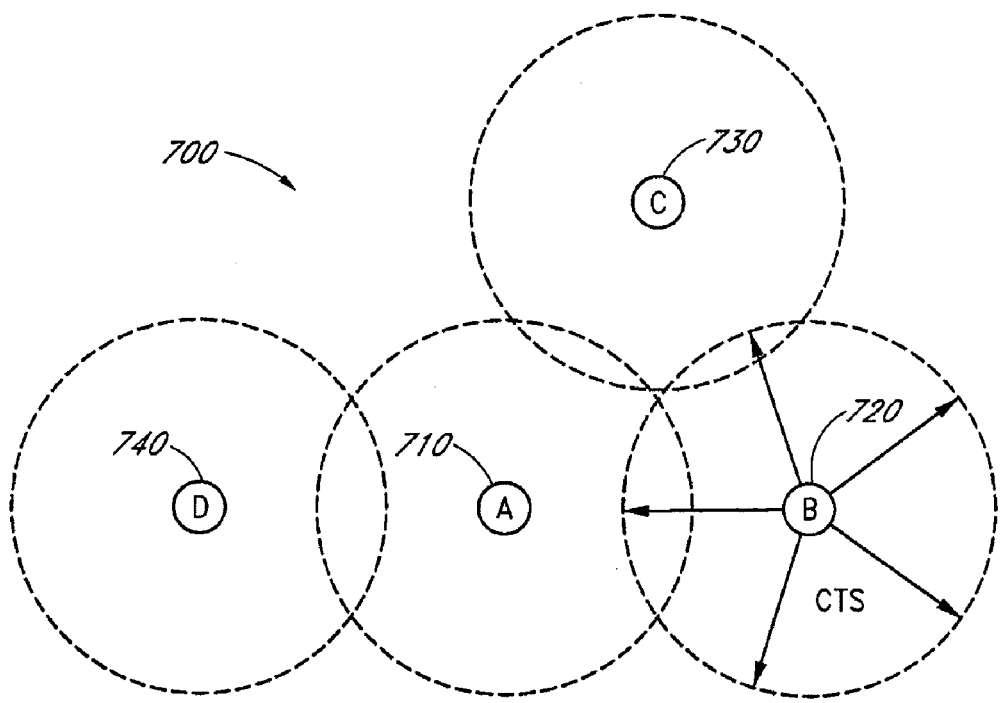
Figure 7C:
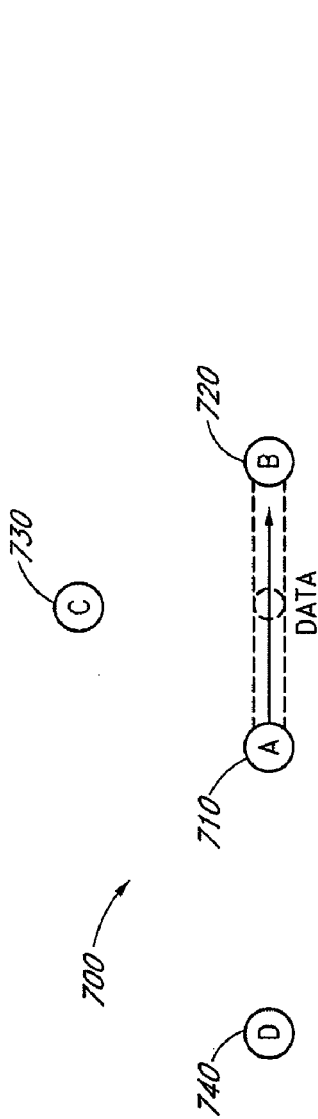

The scheme, however, may have a problem in protecting data transmission in the example wireless network, as described below. Referring to FIGS. 7A-7C, a wireless network 700 includes first to fourth stations 710-740. A skilled technologist will appreciate that the number and relative positions of the stations in the wireless network 700 can vary widely.

Figure 8:
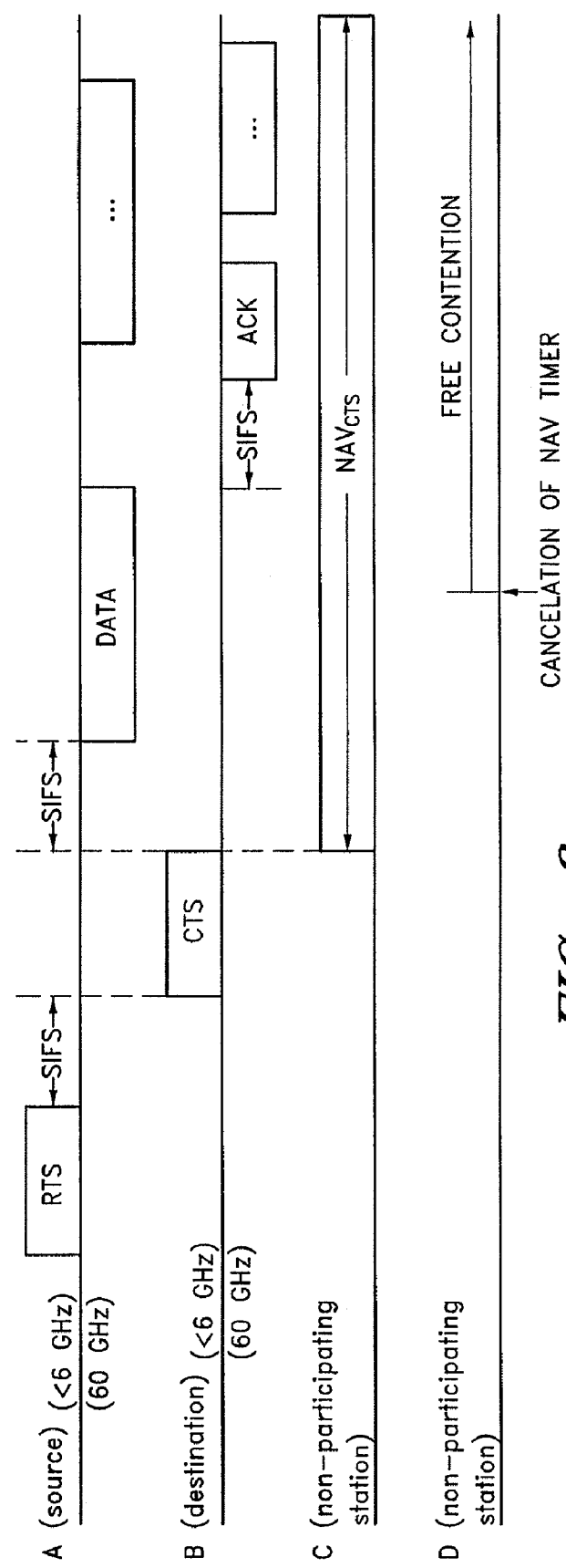
FIG. 8 is a timing diagram illustrating the example method of FIGS. 7A-7C.

Referring now to FIGS. 7A and 8, the first station 710 (a source station) may send a RTS frame to the second station 720 (a destination station) omni-directionally over the low-rate channel. The third and fourth stations 730, 740 (non-participating stations) may receive the RTS frame, and set their NAV timers, based at least partly on a value in the duration field of the RTS frame.

Referring to FIGS. 7B and 8, the second station 720 may send a CTS frame to the first station 730 omni-directionally over the low-rate channel. The third station 730 may detect the CTS frame, and update its NAV timer, based on a value in the duration field of the CTS frame. The fourth station 740, however, may not detect the CTS frame if it is positioned outside the coverage of the CTS frame (for example, as shown in FIG. 7B).

Referring to FIGS. 7C and 8, upon receiving the CTS frame, the first station 710 starts to transmit a data packet(s) to the second station 720 directionally over the high-rate channel The second station 720 may send an ACK frame back to the first station 710 over the high-rate channel. In another embodiment, the second station 720 may send the ACK frame to the first station 710 over the low-rate channel.

At least some of the non-participating stations (e.g., the third and fourth stations 730, 740) may not detect such data transmission over the high-rate channel from the first station 710 because of the directionality and short range of the data transmission over the high-rate channel. While the third station 730 that has received the CTS frame may have updated its NAV timer based on the CTS frame, the fourth station 740 that has detected neither the CTS frame nor the data packet may cancel its NAV timer under IEEE 802.11, as shown in FIG. 8. This may cause the fourth station 740 to contend for data transmission, even if there is an ongoing data transmission between the first station 710 and the second station 720. Therefore, there is a need for a scheme that can prevent such a problem.

Referring now to FIGS. 7A-7C, 9, and 10, a method of transmitting data in a wireless network using multi-rate channels according to one embodiment will be described. In the illustrated embodiment, a wireless network 700 includes a plurality of stations, e.g., first to fourth stations 710-740. Each of the plurality of stations 710-740 includes antenna systems having low rate and high rate transmission capabilities, providing control/management signal transmission over a low rate channel and data transmission over a high rate channel.

At least part of the scheme described above in connection with IEEE 802.11 may apply to the wireless network. As described above in connection with FIGS. 7A-7C, the first station 710, when attempting to transmit data to the second station 720 during a transmission opportunity (TXOP), sends a request-to-send (RTS) frame to the second station 720 omni-directionally over the low-rate channel. If the second station 720 is available for data transmission with the first station 710, it sends a clear-to-send (CTS) frame to the first station 710 omni-directionally over the low rate channel. Upon receiving the CTS frame from the second station 720, the first station 710 starts to send data packet(s) to the second station 720 directionally over the high rate channel. The details of these steps can be as described above in connection with FIGS. 7A-7C.

Figure 9:
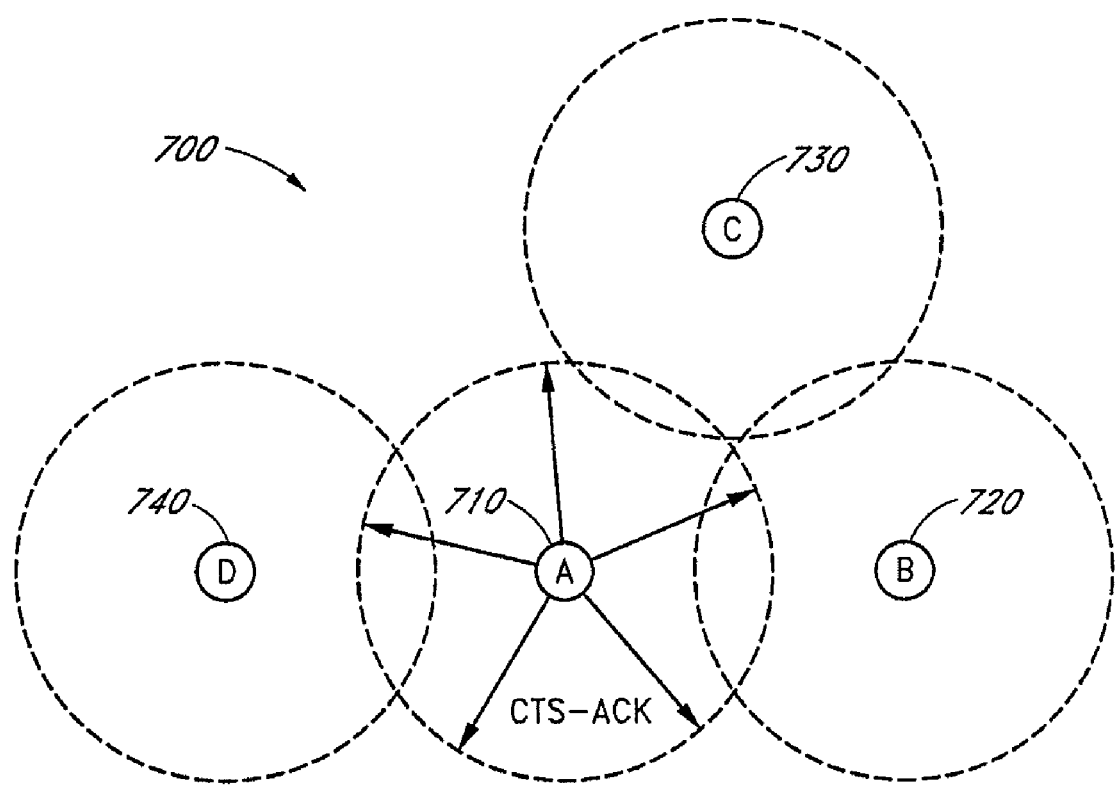
FIG. 9 is a diagram illustrating a step in a method of transmitting data between stations in a multi-rate channel wireless network according to one embodiment.
Figure 10:
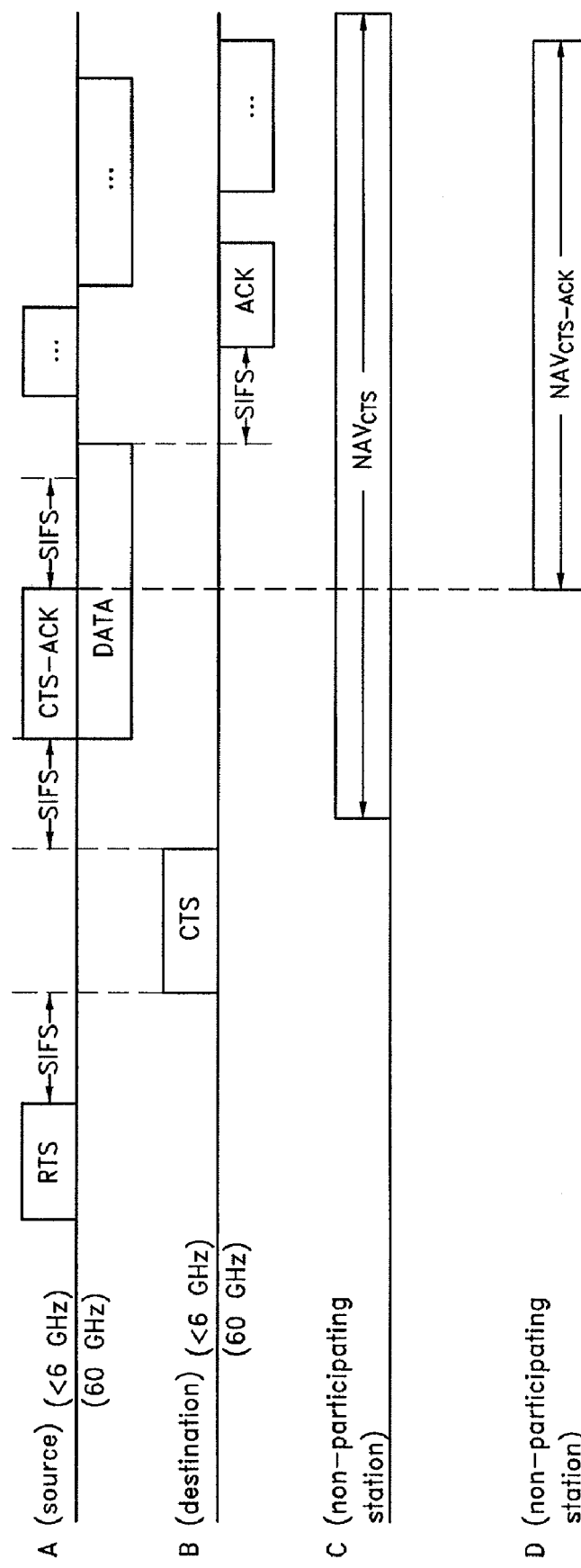
FIG. 10 is a timing diagram illustrating one embodiment of a method of transmitting data between stations in a multi-rate channel wireless network.

Referring to FIGS. 9 and 10, upon receiving the CTS frame from the second station 720, the first station 710 may send a CTS acknowledgment (CTS-ACK) frame omni-directionally over the low-rate channel. Because the CTS-ACK frame is transmitted omni-directionally over the low-rate channel, the second station 720 and the other non-participating stations (for example, the third and fourth stations 730, 740) in the wireless network 700 can detect the CTS-ACK frame. At least partly simultaneously with or immediately before or after the transmission of the CTS-ACK frame, the first station 710 may transmit the data packets.

In one embodiment, the CTS-ACK frame may have a frame format that includes a frame control field, a duration field, a receiver address (RA) field, a transmitter address (TA) field, and a frame check sequence (FCS) field. The frame control field may include information on, for example, protocol version, type, subtype, power management, etc. The duration field may include a value indicative of time that remains in the TXOP after the transmission of the CTS-ACK frame. The RA field includes the address of the destination station that is the intended recipient of the pending data or management frame. The TA field includes the address of the source station. The FCS field may include a cyclic redundancy code (CRC), for example, a 32-bit CRC. The details of the fields of the CTS-ACK frame may vary, based on the design of the wireless network. One or more of the fields may be omitted from the CTS-ACK frame. A skilled technologist will appreciate that the CTS-ACK may include other additional fields or have a different format, depending on the design of the wireless network.

In another embodiment, the CTS-ACK frame may be a NULL frame. The NULL frame can be a data frame with a payload having no actual value. A field in the frame may indicate that the frame is a NULL frame. The Null frame can include: a frame type field, a duration field, a receiver address (RA) field, a transmitter address (TA) field, a NULL payload, and a frame check sequence (FCS) field. The frame type field indicates that it is a Null frame. The duration field may include a value indicating time remaining after the transmission of the NULL frame in the TXOP.

In other embodiments, the CTS-ACK frame may be a clear-to-self (cts-2-self) frame. In such embodiments, the cts-2-self frame may have a format that includes a frame control field, a duration field, a transmitter address (TA) field, and a frame check sequence (FCS) field. The duration field may include a value indicating time remaining after the transmission of the cts-2-self frame in the TXOP. The details of the frame control field, the transmitter address (TA) field, and the frame check sequence (FCS) field can be as described above with respect to the RTS frame. The details of the fields of the cts-2-self frame, however, may vary widely, based on the design of the wireless network. One or more of the fields may be omitted from the cts-2-self frame. The cts-2-self frame may include one or more additional fields for any suitable purpose.

The third station 730, which has detected the CTS frame, may update its NAV timer so that it does not start contention for data transmission, as shown in FIG. 10. The fourth station 740, although it can detect neither the CTS frame nor the data packets, still receives the CTS-ACK frame. The fourth station 740 can update its NAV timer with a value in the duration field of the CTS-ACK frame. Thus, the fourth station 740 does not cancel its NAV timer, thereby refraining from erroneously starting contention for data transmission during the remaining period of time of the TXOP. Thus, even though data transmission is performed over the high-rate channel, the non-participating stations do not interfere with the data transmission under the contention-based protocol of IEEE 802.11 standard.

In the illustrated embodiment, if there is no successful transmission between the first and second stations 710, 720, the first station 710 does not transmit the CTS-ACK frame over the low-rate channel. Thus, absent the CTS-ACK frame, the other non-participating stations cancel their NAV timers after a selected period of time, as provided by the default scheme of IEEE 802.11, and thus can freely contend for data transmission thereafter.

Figure 11:
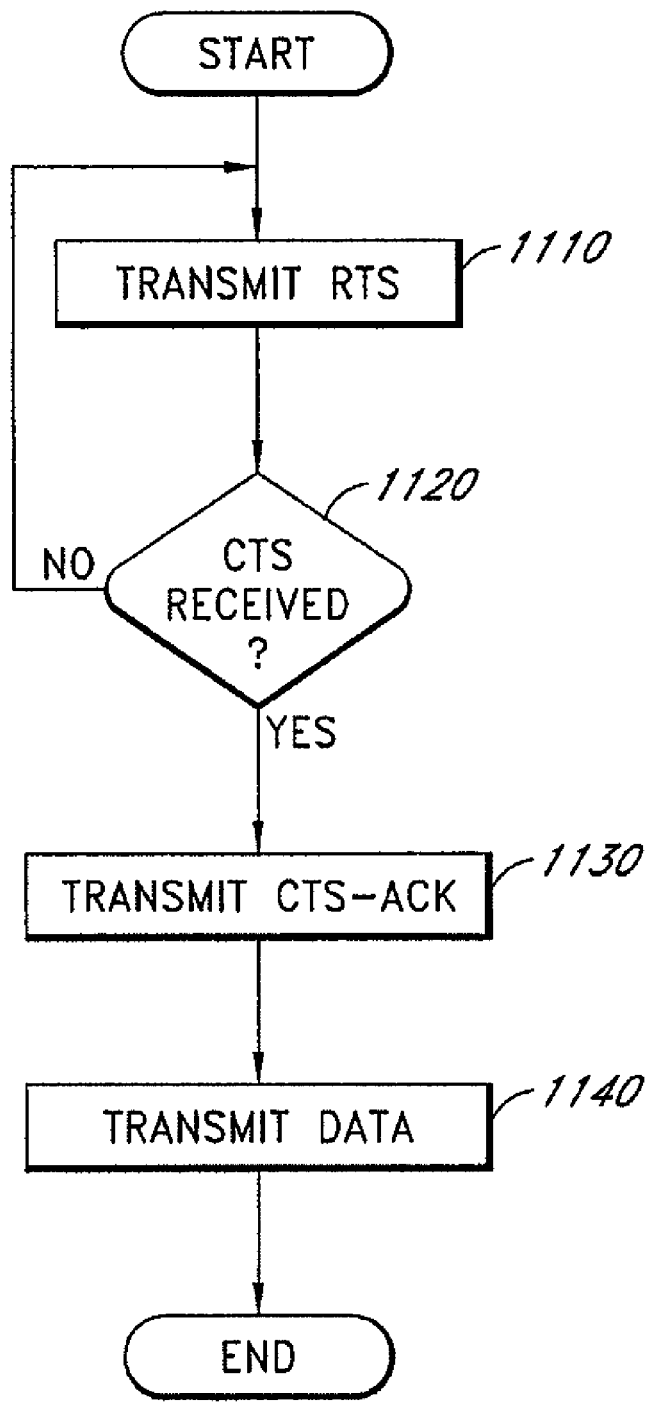
FIG. 11 is a flowchart illustrating one embodiment of a method of transmitting data between stations in a multi-rate channel wireless network.

Referring to FIG. 11, one embodiment of a method of transmitting a data or management signal in a wireless network using multi-rate channels will be described below. The multi-rate channel may include a high-rate channel and a low-rate channel. The illustrated embodiment may apply to various wireless networks, including, for example, the network shown in FIG. 2, and the details of the wireless network can be as described above in connection with FIG. 2. The illustrated method may occur at a source station in the wireless network when sending data to a destination station.

At block 1110, the source station omni-directionally transmits a RTS frame to the destination station over a low-rate channel. At block 1120, the source station determines if it has received a CTS frame from the destination station over the low-rate channel. If yes, at block 1130 the source station omni-directionally sends a CTS-ACK frame over the low-rate channel. At block 1140, the source station may start transmitting data packets directionally over the high-rate channel at least partly simultaneously with or immediately before or after sending the CTS-ACK frame. If no, the process returns to the block 1110, and waits for a next available time slot for contention for data transmission.

The embodiments described above may be used for data (e.g., video data and audio data) streaming over a wireless network. For example, the embodiments may be adapted for transmission of uncompressed video in a wireless local area network (WLAN) under IEEE 802.11 standard. The embodiments can also be adapted for a wireless system having a very high throughput (VHT) of about 0.5 Gbps to about 4 Gbps. In other arrangements, the embodiments can be adapted for a wireless system having a bandwidth of 60 GHz, while supporting IEEE 802.11 standard.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A first device for wireless communication, the first device comprising:
a first antenna system that provides directional transmission/reception at a first frequency within a first range;
a second antenna system that provides omni-directional transmission/reception at a second frequency within a second range, the second frequency being lower than the first frequency, the second range being greater than the first range; and
a medium access control (MAC) layer that uses the second antenna system to send a second wireless device a request for wireless data transmission via the first antenna system; and
wherein the MAC layer:

uses the second antenna system for receiving an approval for the wireless data transmission from the second wireless device,
uses the second antenna system for transmitting an acknowledgment of the approval upon receiving the approval,
uses the first antenna system to transmit one or more data packets to the second wireless device upon receiving the approval, and
refrains from contending for data transmission based at least partly on the acknowledgement of the approval.

2. The first device of claim 1, wherein the first frequency is 6 GHz or greater, and wherein the second frequency is 6 GHz or lower.

3. The first device of claim 2, wherein the first frequency comprises about 60 GHz, and wherein the second frequency comprises about 2.4 GHz or about 5 GHz.

4. The first device of claim 1, wherein the first device communicates with the second wireless device during a period of time allocated by a contention-based protocol.

5. The first device of claim 4, wherein the MAC layer reserves the period of time at least partly in compliance with IEEE 802.11.

6. The first device of claim 4, wherein the MAC layer reserves the period of time, and the reserved period of time comprises a transmission opportunity.

7. The first device of claim 5, wherein the MAC layer uses Distributed Coordination Function (DCF) or Enhanced Distributed Channel Access Function (EDCAF).

8. The first device of claim 7, wherein the reserved period of time comprises a transmission opportunity (TXOP).

9. The first device of claim 8, wherein the request for the wireless data transmission comprises a request-to-send (RTS) frame, and wherein the approval for the wireless data transmission comprises a clear-to-send (CTS) frame.

10. The first device of claim 7, wherein the MAC layer uses either the first antenna system or the second antenna system during the transmission opportunity (TXOP).

11. The first device of claim 9, wherein the acknowledgment of the approval comprises an acknowledgment of the CTS (CTS-ACK) frame.

12. The first device of claim 11, wherein the MAC layer transmits the CTS-ACK frame after a short interframe space (SIFS) interval after receiving the CTS frame.

13. The first device of claim 11, wherein the CTS-ACK frame contains a value indicative of time remaining in the TXOP after the transmission of the CTS-ACK frame.

14. The first device of claim 9, wherein the CTS-ACK flame comprises a NULL flame or a clear-to-self frame.

15. The first device of claim 1, wherein the MAC layer comprises one or more of a control plane, a management plane, a high-rate data plane, and a low-rate data plane.

16. The first device of claim 14, wherein one or more of the control plane, the management plane, and the low-rate data plane are in compliance with IEEE 802.11.

17. The first device of claim 1, further comprising a physical (PHY) layer that includes a high-rate physical layer and a low-rate physical layer, wherein the high-rate physical layer includes the first antenna system, and wherein the low-rate physical layer includes the second antenna system.

18. The first device of claim 1, wherein the MAC layer refrains from contending for data transmission for a first period of time based at least partly on the request.

19. The first device of claim 18, wherein the MAC layer refrains from contending for a second period of time based at least partly on the acknowledgement of the approval.

20. The first device of claim 19, wherein the second period of time being shorter than the first period of time.

21. The first device of claim 1, wherein the request for the wireless data transmission comprises a first frame, the approval for the wireless data transmission comprises a second frame, and the acknowledgement of the approval comprises a third frame.

22. The first device of claim 21, wherein the third frame contains a value indicative of time remaining in a transmission opportunity after the transmission of the third frame.

23. A method of wireless communication, the method comprising:

transmitting, from a first wireless device to a second wireless device, a request for wireless data transmission via a first channel having a first frequency and directionality, wherein transmitting the request comprises using a second channel having a second frequency and omni-directionality, the second frequency being lower than the first frequency;

transmitting, from the second wireless device to the first wireless device, an approval for the wireless data transmission over the second channel;

transmitting, from the first wireless device, an acknowledgment (ACK) of the approval over the second channel; and transmitting, from the first wireless device to the second wireless device, data over the first channel, wherein the first wireless device refrains from contending for data transmission based at least partly on the ACK of the approval.

24. The method of claim 23, wherein the first frequency is 6 GHz or greater, and wherein the second frequency is 6 GHz or lower.

25. The method of claim 23, wherein transmitting the ACK of the approval comprises transmitting the ACK of the approval at least partly simultaneously with or immediately before or after transmitting the data.

\* \* \* \* \*